W. Baker.
Making Hoes.

N° 1,340.
32,344.

Patented May 21, 1861.

Witnesses:
W. Yorke Ardee
A C Widdicombs

Inventor:
Walter Baker
Thomas H. Dodge Atty

UNITED STATES PATENT OFFICE.

WALTER BAKER, OF WEST WINSTED, CONNECTICUT.

IMPROVEMENT IN MANUFACTURE OF HOES.

Specification forming part of Letters Patent No. 32,344, dated May 21, 1861.

*To all whom it may concern:*

Be it known that I, WALTER BAKER, of West Winsted, in the county of Litchfield and State of Connecticut, have invented a certain new and useful Mode of Manufacturing Hoes; and I do hereby declare that the following is a clear, full, and exact description of the same, reference being had to the accompanying drawings, forming a part of this specification, and in which—

Figure 2:
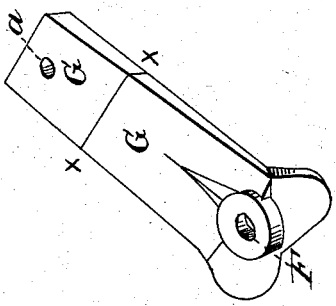
Figure 3:
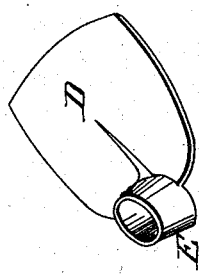
Figure 1:
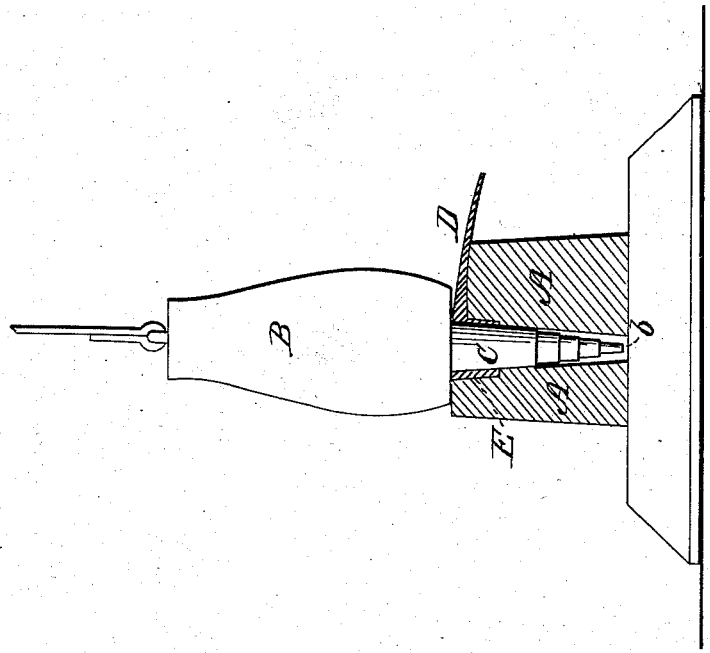

Figure 1 represents a section through the center of the eye and blade of the hoe, as shown in Fig. 3, as it appears when in the process of construction from a single piece of iron, as seen in Fig. 2.

Hoes as heretofore constructed have had their eyes formed by welding together two lips of iron over a spindle, which is a costly mode of construction. To obviate the great cost and trouble attending this plan, I have devised a mode of construction whereby the eye and blade of the hoe are made from a single piece without welding.

The operation is as follows: The metal is first rolled out into strips or bars, as seen at G, Fig. 3, and then punched with holes $a$ at suitable distances apart, when the bar is cut up into pieces, as on line $x$ $x$, same figure. The pieces so cut up are then taken and placed, after being properly heated, on a perforated anvil or die-plate A, Fig. 1, (shown in section for the purpose of exposing the die or sinker C,) with the hole $a$ just under the point $b$ of a tapering die or sinker, C, attached to a drop, B. The lower end of C is grooved or corrugated, as shown in the drawings. By the continued action of the die C, as it is dropped, the metal is carried down by the corrugated surfaces at its lower end until the eye E is formed, when the blade of the hoe is drawn out and properly shaped; or the part A may be so formed that the blade D can be formed at the same time as the eye E.

F, Fig. 2, shows the eye E when partially formed.

Having described my invention, what I claim, and desire to secure by Letters Patent, as an improved article of manufacture, is—

A hoe formed from a single piece of metal, in the manner substantially as shown and described.

In witness whereof I have hereunto subscribed my name.

WALTER BAKER.

In presence of—
   HENRY A. BILLS,
   WILLIAM TREAT.